United States Patent
Chang Chien

(10) Patent No.: US 8,578,392 B2
(45) Date of Patent: Nov. 5, 2013

(54) LAPTOP COMPUTER FOR PROCESSING ORIGINAL HIGH RESOLUTION IMAGES AND IMAGE-DATA-PROCESSING DEVICE THEREOF

(75) Inventor: Wei-Cheng Chang Chien, Kaohsiung (TW)

(73) Assignee: Alpha Imaging Technology Corp., Jhubei, Hsinchu County (TW)

( * ) Notice: Subject to any disclaimer, the term of this patent is extended or adjusted under 35 U.S.C. 154(b) by 98 days.

(21) Appl. No.: 13/196,959

(22) Filed: Aug. 3, 2011

(65) Prior Publication Data

US 2012/0072921 A1 Mar. 22, 2012

(30) Foreign Application Priority Data

Sep. 17, 2010 (TW) .............................. 99131715 A

(51) Int. Cl.
*G06F 9/44* (2006.01)
*G06F 5/06* (2006.01)
(52) U.S. Cl.
USPC ........................................... 719/312; 710/52
(58) Field of Classification Search
None
See application file for complete search history.

(56) References Cited

U.S. PATENT DOCUMENTS

| | | | |
|---|---|---|---|
| 4,829,454 A | 5/1989 | Kurakake et al. | |
| 4,985,848 A | 1/1991 | Pfeiffer et al. | |
| 6,173,394 B1 | 1/2001 | Guttag et al. | |
| 7,536,487 B1* | 5/2009 | Kohn | 710/52 |
| 8,031,958 B2 | 10/2011 | Saito et al. | |
| 2001/0012064 A1* | 8/2001 | Kubo | 348/231 |
| 2006/0170786 A1* | 8/2006 | Won | 348/222.1 |
| 2007/0146505 A1* | 6/2007 | Billerbeck | 348/231.6 |
| 2008/0309781 A1* | 12/2008 | Lee | 348/222.1 |
| 2011/0090242 A1* | 4/2011 | Cote et al. | 345/597 |

FOREIGN PATENT DOCUMENTS

| | | |
|---|---|---|
| CN | 1874409 A | 12/2006 |
| CN | 101098436 A | 1/2008 |
| EP | 0210434 A2 | 2/1987 |
| WO | WO 2006/025625 A1 | 3/2006 |

OTHER PUBLICATIONS

Jaein Jeong "Incremental Network Programming for Wireless Sensors", Nov. 21, 2005.*

* cited by examiner

*Primary Examiner* — Lechi Truong
*Assistant Examiner* — Abdou Seye
(74) *Attorney, Agent, or Firm* — Birch, Stewart, Kolasch & Birch, LLP

(57) ABSTRACT

An image-data-processing device for processing first image data includes an image processing chip with a first memory and a second memory. The image processing chip further includes a data managing unit and a coding module, wherein the memory space of the second memory is greater than the memory space of the first memory. The data managing unit receives the first image data from an image sensor and transmits the image data to the encoding module, wherein the encoding module generates a second image data based on the first image data received. The data managing unit then selectively stores the second image data in the first memory or the second memory.

2 Claims, 6 Drawing Sheets

LAPTOP COMPUTER FOR PROCESSING ORIGINAL HIGH RESOLUTION IMAGES AND IMAGE-DATA-PROCESSING DEVICE THEREOF

BACKGROUND OF THE INVENTION

1. Field of the Invention

The present invention relates generally to a laptop computer for processing image data and an image-data-processing device thereof. More particularly, the present invention relates to a laptop computer for processing high resolution image data and an image-data-processing device thereof.

2. Description of the Prior Art

In the past, low resolution image-data-processing devices generated images with sizes approximately a few hundred kilobytes. Since the image resolution is not relatively high, the storage space and processing memory bandwidth requirement is correspondingly not high, and thus each frame of the images requiring storage may all subsequently be stored directly in the memory of the image-data-processing device. However, as image resolution increases, the storage space and processing memory bandwidth requirements of each frame of image also increases.

As shown in FIG. 1 of a block diagram of a conventional image-data-processing device 10, the conventional image-data-processing device 10 includes a data managing unit 20, an internal memory 21, an encoding module 22, and a communication interface 23, wherein the conventional image-data-processing device 10 communicates with external electronic devices such as a display 24 via the communication interface 23.

As shown in FIG. 1, the data managing unit 20 is connected to and receives first image data from an image sensor 30. The data managing unit 20 then transmits the first image data to the encoding module 22 to be converted into second image data, wherein the encoding module 22 via the data managing unit 20 and the communication interface 23 outputs the second image data for displaying or for any other purposes. In addition, the data managing unit 20 may also store the second image data in the internal memory 21 for future comparisons to be performed by the encoding module 22 during video encoding.

FIG. 2 illustrates a conventional laptop computer 40 which includes the conventional image-data-processing device 10 of FIG. 1. As shown in FIG. 2, the laptop computer 40 includes the conventional image-data-processing device 10, the image sensor 30, and a display 50. Due to the position of users relative to the conventional laptop computer 40, the image sensor 30 is usually disposed on the upper portions of the frame enclosing the display 50. The frame enclosing the display 50 is restricted within the dimension specifications of the laptop computer 40. The dimensions of the image-data-processing device 10 after packaging, in this regard, are also subject to the limitations of the dimension specifications imposed on the frame enclosing the display 50.

However, as image resolution increases, each frame of image data requires even more storage space and processing memory bandwidth. The storage space and corresponding processing memory bandwidth requirements of every first image data that is to be processed by the conventional image-data-processing device 10 are relatively large (minimum of at least few Megabytes). Accordingly therefore, when encoding high resolution video, the conventional image-data-processing device 10 would require relatively larger space to store the first image data.

In order to overcome the storage space difficulties, additional static random access memories (SRAM) may be added to the conventional image-data-processing device 10. However, with the addition of the SRAM, the dimensions of the conventional image-data-processing device 10 would correspondingly exceed the physical space available for accommodating the conventional image-data-processing device 10. Unfortunately, increases in image resolution are bound to correspondingly require the conventional image-data-processing device 10 to have greater capacity of memory for storing the image data. Under these circumstances, this means to increase the available memory space for storing data while simultaneously maintaining the existing physical dimensions of the image-data-processing device has become an important design aspect of the image-data-processing device.

SUMMARY OF THE INVENTION

It is an objective of the present invention to provide an image-data-processing device having a new structure, wherein the image-data-processing device can process high resolution image data while maintaining its package size at an acceptable range.

It is another objective of the present invention to provide a laptop computer for processing high resolution image data.

The image-data-processing device of the present invention includes an image processing chip for encoding first image data received from an image sensor into a second image data. The image processing chip includes a data managing unit, a coding module, and a first memory, wherein the first memory stores operational data or any other related data pertaining to the operation of the image processing chip. The operational data may also include operational commands that facilitate the processing of the first image data in the image processing chip. The data managing unit receives and transmits the first image data to the encoding module, wherein the coding module then converts the first image data to the second image data according to a video compression standard such as H.264.

The image-data-processing device further includes a second memory connected to the data managing unit of the image processing chip, wherein the data managing unit receives and stores the second image data from the encoding module to the second memory. The mentioned structure can limit the memory space and volume of the first memory. Furthermore, the second memory is preferably connected to the data managing unit of the image processing chip, but is not limited thereto. In different embodiments, if necessary due to physical space requirements, the second memory and the image processing chip may also be connected through a connection unit. Furthermore, the data managing unit includes a memory address corresponding to the storage address of the first memory and the second memory. In this manner, the data managing unit can store the image data, based on the size of the image data, in a suitable memory.

DETAILED DESCRIPTION OF THE PREFERRED EMBODIMENT

The present invention relates to a laptop computer for processing first image data and an image-data-processing device thereof, wherein the first image data R includes data in .arw, .srw, .dng or other raw image formats well-known in the image processing field. In particular, the present invention relates to a laptop computer for processing first image data and an image-data-processing device thereof. The image-data-processing device of the present invention, under physical dimensional restrictions, utilizes structures and data transmission methods different from those of the prior art in order to increase additional memory while still maintaining the original specification dimensions thereof, such as height.

Figure 1:
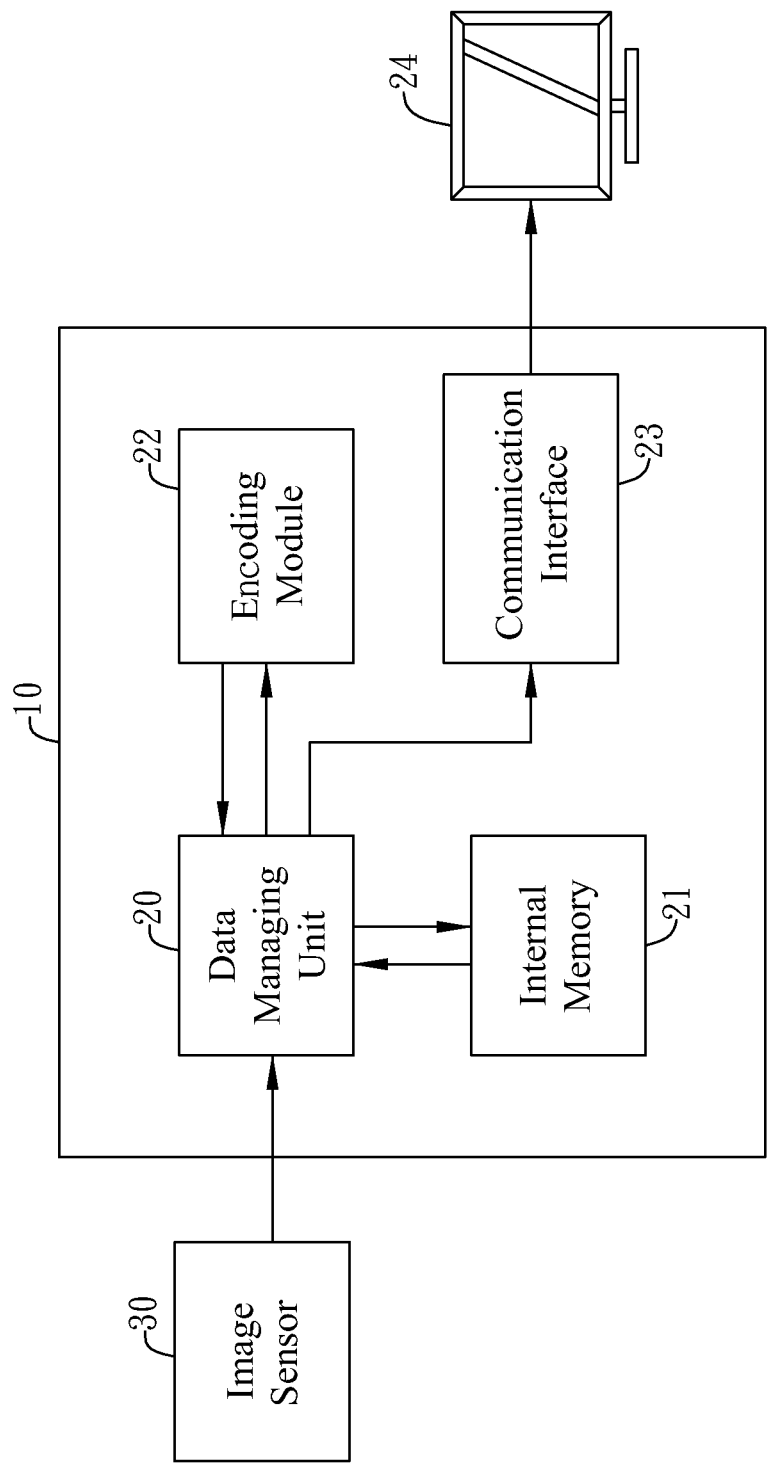
FIG. 1 is a block diagram illustrating a conventional image-data-processing device.
Figure 2:
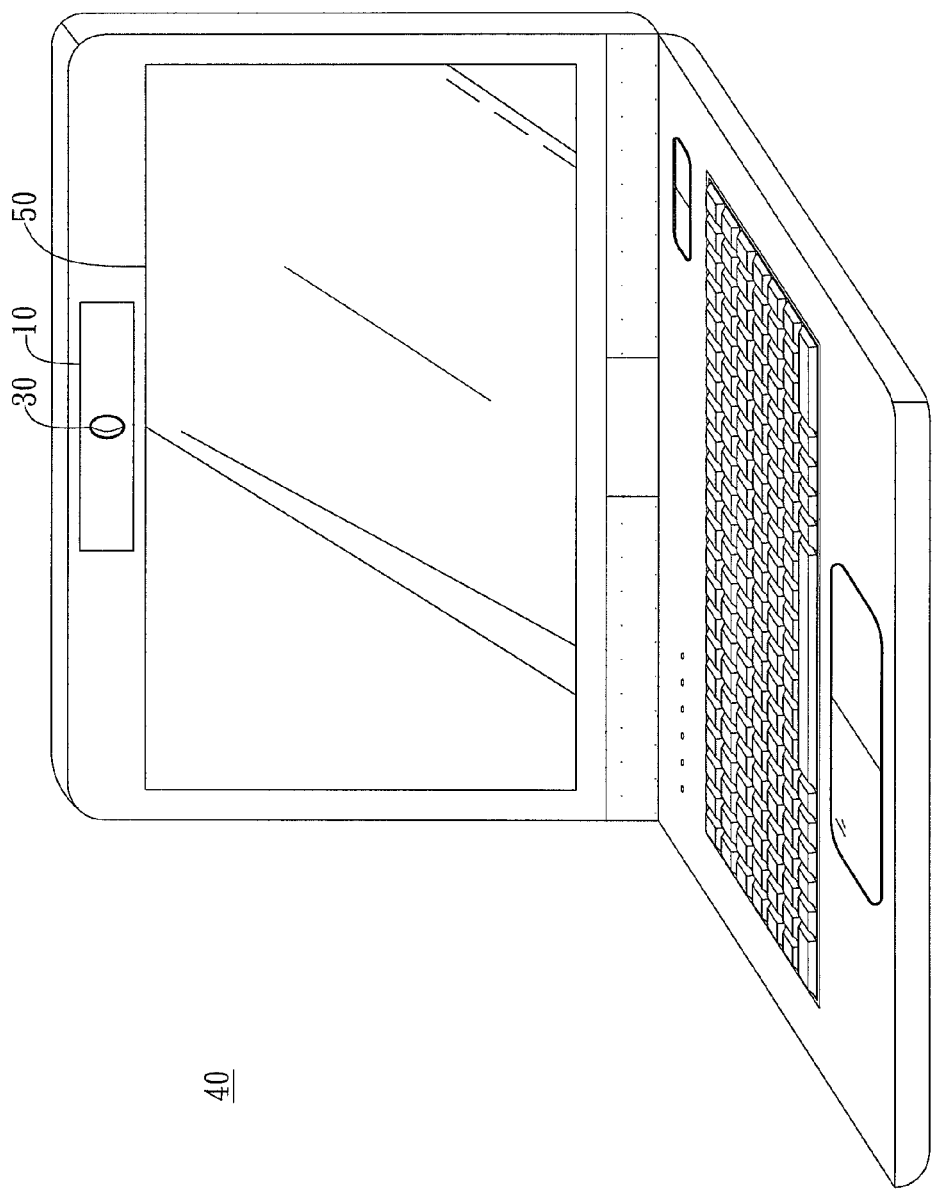
FIG. 2 is a schematic view illustrating a laptop computer having the conventional image-data-processing device illustrated in FIG. 1.
Figure 3:
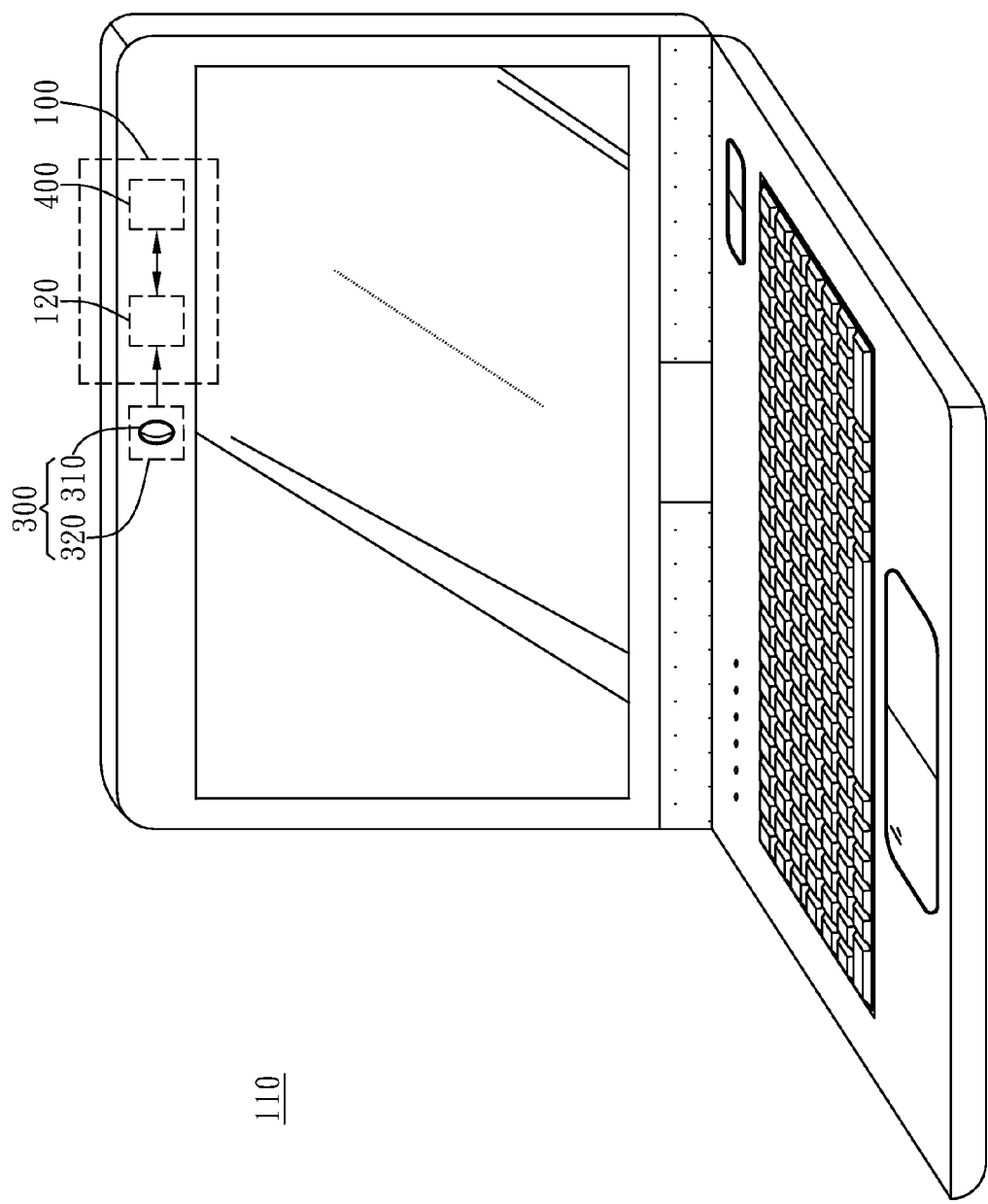
FIG. 3 is a laptop computer of the present invention.

FIG. 3 illustrates a laptop computer 110 of the present invention for processing first image data. In the present embodiment, the laptop computer 110 includes an image-data-processing device 100 and an image sensor 300, wherein the image sensor 300 of the present embodiment is preferably a charge-coupled device (CCD), but is not limited thereto. In different embodiments, the image sensor 300 may also include complementary metal oxide semiconductors (CMOSs) or any other image devices to generate first image data.

In the present embodiment, the image sensor 300 includes a lens 310 and a raw data module 320, wherein the raw data module 320 generates first image data according to the image and the luminance observed by the lens 310. Furthermore, the image sensor 300 can generate first image data with resolution greater than 1280×720, but is not limited thereto. In different embodiments, the image sensor 300 can selectively generate first image data with the resolution lower than 1280×720.

In the embodiment illustrated in FIG. 3, the image-data-processing device 100 receives and converts first image data from the image sensor 300 to a second image data. In the present embodiment, the second image data C is the high definition video produced by the H.264 video compression standard, but is not limited thereto. In different embodiments, the second image data C includes raster format such as jpeg, vector format, or other graphic file formats well-known in the image processing field. The image-data-processing device 100 then transmits the second image data to a central processing unit or the display of the laptop computer 110. As shown in FIG. 3, the image-data-processing device 100 includes an image processing chip 120 and an external memory 400, wherein the external memory 400 is connected to a data managing unit (not shown) of the image processing chip 120, but is not limited thereto.

Figure 4:
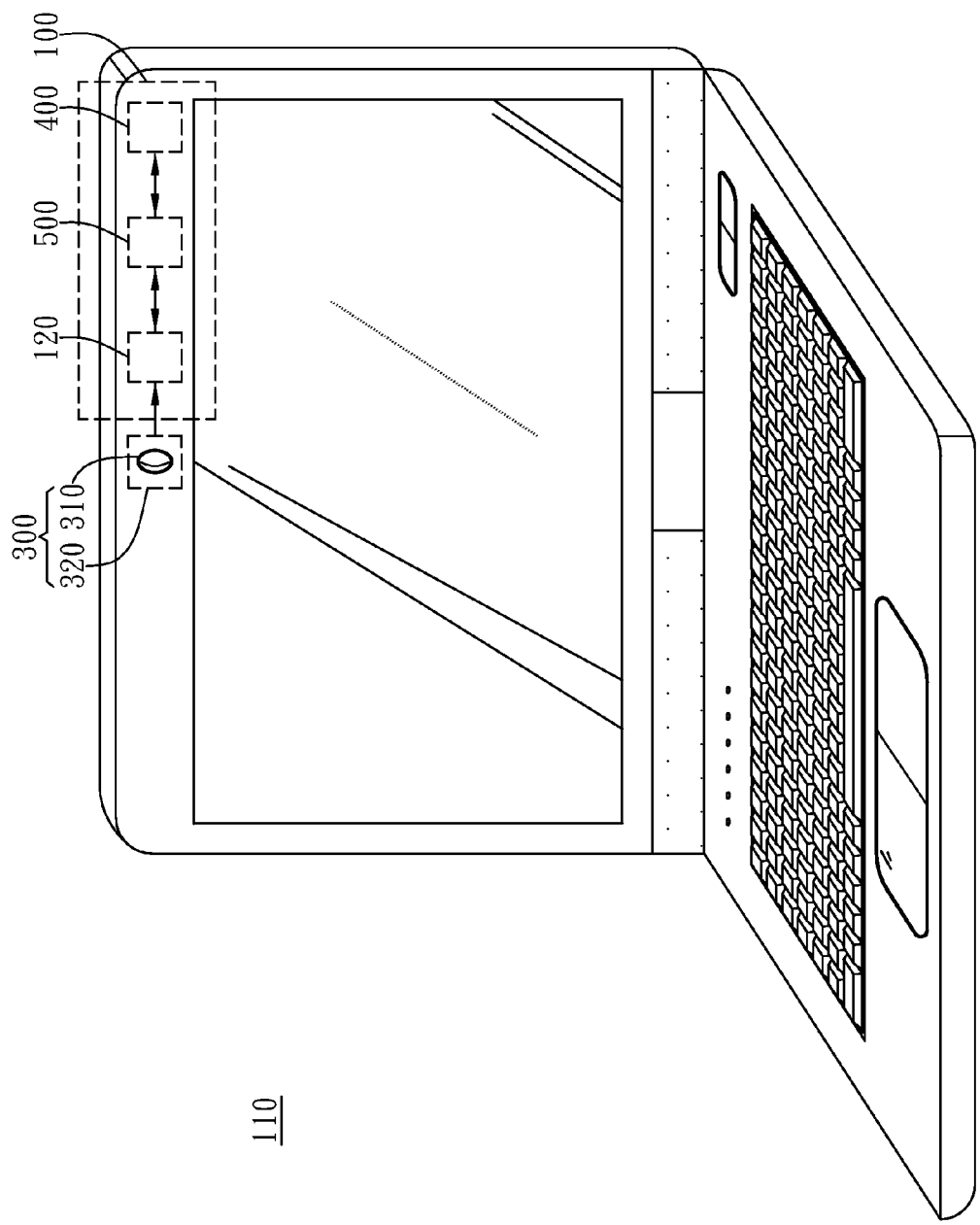
FIG. 4 illustrates another embodiment of the laptop computer of the present invention.

As shown in the embodiment illustrated in FIG. 4, the image-data-processing device 100 further includes a connection unit 500 disposed between the image processing chip 120 and the external memory 400. The connection unit 500 is respectively connected to both the image processing chip 120 and the external memory 400, allowing the image processing chip 120 to establish a link to the external memory 400 through the connection unit 500. Through this configuration, the external memory 400 may be disposed in any suitable location and then connected to the image processing chip 120 through the connection unit 500. For instance, so long as the image processing chip 120 is electrically connected to the external memory 400, the image processing chip 120 and the external memory 400 may be disposed on opposite ends of the display of the laptop computer 110, or at any other locations adjacent to the display of the laptop computer 110. In addition, the connection unit 500 of the present embodiment is a known electrical connector, but is not limited thereto. In different embodiments, the connection unit 500 may also include any type of printed circuit boards (PCBs), multi-chip packages, or any other technologies for establishing electrical connections between electronic components.

Figure 5:
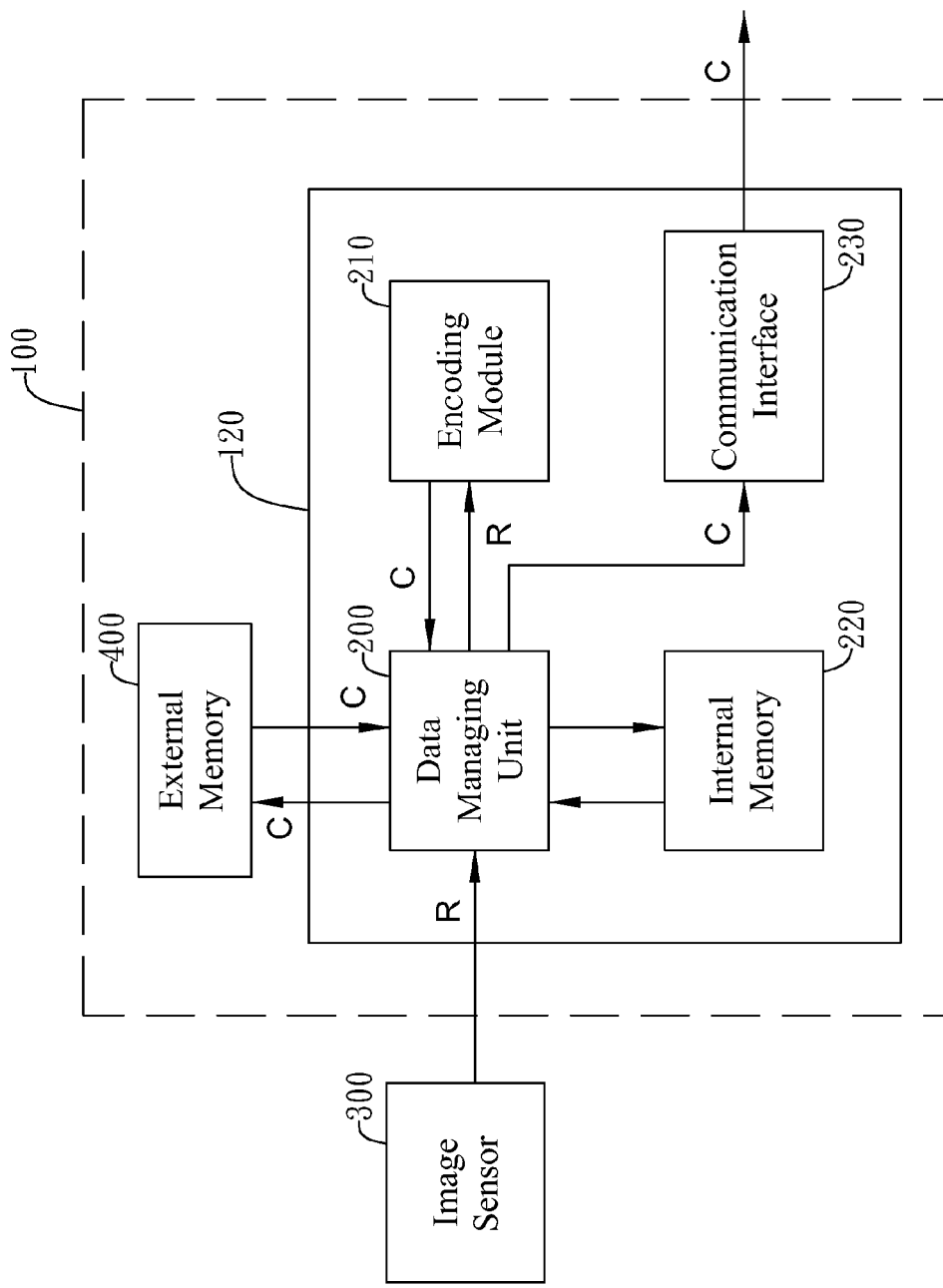
FIG. 5 is a block diagram illustrating the image-data-processing device of the present invention.

FIG. 5 is a block diagram illustrating the image-data-processing device 100 of the present invention. As shown in FIG. 5, the image-data-processing device 100 is connected to the image sensor 300 and is utilized to process the first image data R generated by the image sensor 300. The image sensor 300 may be a webcam or any other digital image sensors that can be used to convert images into first image data R. The image sensor 300 of the present embodiment can generate the first image data R with resolution higher than 1280×720, but it is not limited thereto. In different embodiments, the image sensor 300 can selectively generate first image data R with resolution lower than 1280×720. In addition, the first image data R includes .arw, .srw, .dng or other raw image formats well-known in the image processing field. Furthermore, the image sensor 300 of the present embodiment includes charge-coupled devices, but is not limited thereto. In different embodiments, the image sensor 300 can also include complementary metal oxide semiconductors or any other imaging devices to generate first image data R.

As shown in FIG. 5, the image-data-processing device 100 includes an image processing chip 120 and an external memory 400, wherein the image processing chip 120 is electrically coupled to the external memory 400. In the present embodiment, the packaged image processing chip 120 is packaged and has a system-on-a-chip (SoC) structure. In the embodiment illustrated in FIG. 5, the image processing chip 120 includes a data managing unit 200, an encoding module 210, and an internal memory 220, wherein the data managing unit 200 is connected to the internal memory 220, the image sensor 300, and the external memory 400.

The data managing unit 200 receives and transmits the first image data R from the image sensor 300 to the encoding module 210 for further image processing. In the present embodiment, the encoding module 210 complies with the H.264 video compression standard in processing the first image data R with respect to high resolutions, but the standard utilized by the encoding module 210 is not limited thereto. In different embodiments, the encoding module 210 may also utilize other video compression standards. The data managing unit 200 of the present embodiment is a microcontroller, but is not limited thereto. In different embodiments, the data managing unit 200 may also include microprocessors, digital signal processors, or any other related electronic devices for processing electrical signals.

In the embodiment illustrated in FIG. 5, the data managing unit 200 transmits the first image data R received from the image sensor 300 to the encoding module 210, wherein the encoding module 210 converts the first image data R to a second image data C according to the H.264 video compression standard. The encoding module 210 then transmits the second image data C back to the data managing unit 200. Upon receiving the second image data C, the data managing unit 200 stores the second image data C in the external memory 400. In other words, the data managing unit 200 stores the second image data C that was originally internally stored in an external component. The data managing unit 200 can selectively store the second image data C or any other data in the internal memory 220 or the external memory 400. In other words, the data managing unit 200 can store data in a suitable memory, such as internal memory 220 or external memory 400, based on the size of image data or other characteristics. In the present embodiment, the second image data C is the high definition video produced by the H.264 video compression standard, but is not limited thereto. In different embodiments, the second image data C includes raster format such as jpeg, vector format, or other graphic file formats well-known in the image processing field.

In the present embodiment, the internal memory 220 stores operational information for the operation of the data managing unit 200. The memory space of internal memory 220 in the present embodiment is approximately a few hundred kilobytes, but is not limited thereto. The external memory 400 is preferably used to store the second image data C and especially the high resolution second image data C generated by the encoding module 210. Furthermore, the memory space of external memory 400 in the present embodiment is approximately a few megabytes, but is not limited thereto. The internal memory 220 is used primarily to store operational information instead of image data. In this way, the internal memory 220 requires less memory space and therefore is smaller in volume/dimension. The second image data C greater in data size than the operational information is stored in the external memory 400. As a result, the image processing chip 120 is free to process high resolution data and comparatively to the prior art can also have smaller volume. The internal memory 220 and the external memory 400 of the present embodiment are both random access memories, but are not limited thereto. In different embodiments, the internal memory 220 and the external memory 400 may also include flash memories or any other data storage devices.

Furthermore, the image processing chip 120 illustrated in FIG. 5 further includes a communication interface 230 for connection to the memory or data processor of other electronic devices external to the packaged image processing chip 120. The communication interface 230 of the present embodiment is electrically connected to the data managing unit 200 and the memory of a laptop computer, wherein the data managing unit 200 transmits the second image data C to the laptop computer through the communication interface 230. In this way, the second image data C can be used by a display to display images or transmitted to other electronic devices via communication network.

Figure 6:
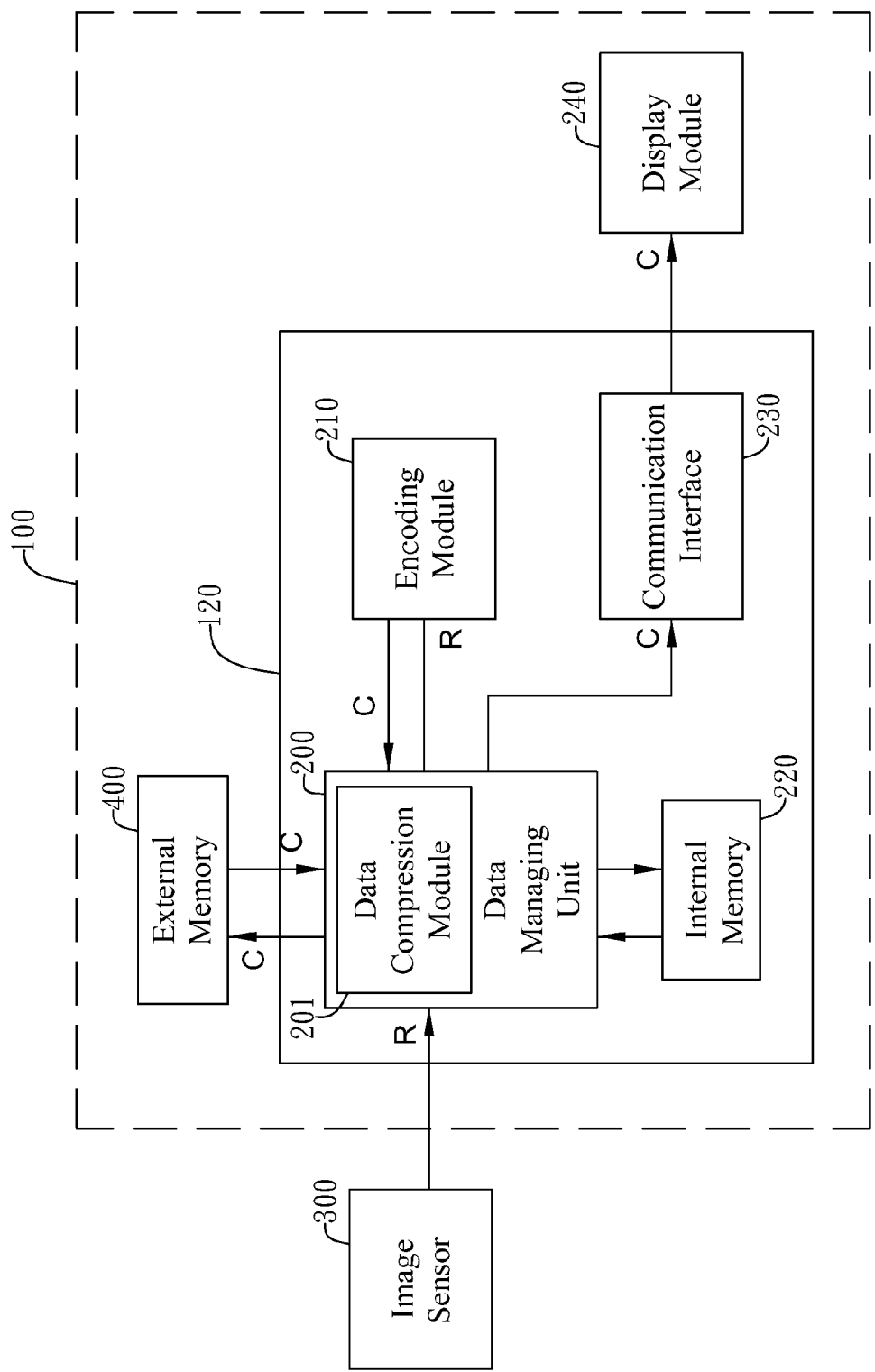
FIG. 6 is a block diagram illustrating another embodiment of the image-data-processing device of the present invention.

FIG. 6 illustrates yet another embodiment of the image-data-processing device 100 of the present invention. In the present embodiment, the data managing unit 200 includes a data compression module 201 that compresses the second image data C generated by the encoding module 210. The compressed second image data C is then selectively transmitted to the internal memory 220 or the external memory 400. The data compression module 201 includes only one data compression rate, which is used as a ratio reference for data compression. However, the data compression module 201 is not limited thereto. In different embodiments, the data compression module 201 may also have a plurality of data compression rates. In this way, the data compression module 201 can compress the second image data C at a suitable data compression rates selected based on the memory space or other factors.

Furthermore, the image-data-processing device 100 illustrated in FIG. 6 further includes a display module 240 connected to the data managing unit 200, wherein the data managing unit 200 transmits the second image data C generated by the encoding module 210 to the display module 240 through the communication interface 230 so that the display module 240 can generate images based on the second image data C received. The display module 240 of the present embodiment is a liquid crystal display, but is not limited thereto; in different embodiments, the display module 240 also includes displays of laptop computers, organic light emitting diode displays, and other displays that can be used to generate images based on the second image data C.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An image-data-processing device for processing a first image data, comprising:
    an image processing chip, including:
    a data managing unit for receiving the first image data from an image sensor;
    an encoding module for generating a second image data based on the first image data received from the data managing unit; and
    a first memory including an encoding data for the encoding module to code the first image data based on the encoding data in order to generate the second image data;
    a second memory connected to the image processing chip, wherein the data managing unit is used for selectively storing the second image data in the first memory or the second memory based on a size of the second image data;
    a connection unit connected to the data managing unit and the second memory to establish a signal connection between the data managing unit and the second memory;
    an image display module for generating an image based on the second image data; and
    a communication interface connected to the data managing unit and the image display module, wherein the encoding module is used for transmitting the second image data to the image display module through the data managing unit and the communication interface;
    wherein the data managing unit includes a memory address corresponding to both the first memory and the second memory, a memory space of the second memory is greater than a memory space of the first memory;
    wherein the data managing unit includes a data compression module for compressing the second image data and storing the compressed second image data selectively in the first memory or the second memory; and
    wherein if the size of the second image data is larger enough, the data managing unit will store the second image data in the second memory instead of the first memory.

2. A laptop computer for processing a first image data, comprising:
    an image sensor for generating the first image data;
    an image processing chip, including:
    a data managing unit for receiving the first image data from the image sensor;
    an encoding module for generating a second image data based on the first image data received from the data managing unit; and
    a first memory including an encoding data, wherein the encoding module is used for encoding the first image data based on the encoding data to generate the second image data;
    a second memory connected to the image processing chip, wherein the data managing unit is used for selectively storing the second image data in the first memory or the second memory based on a size of the second image data;

a connection unit connected to the data managing unit and the second memory to establish a signal connection between the data managing unit and the second memory;

an image display module for generating an image based on the second image data; and a communication interface connected to the data managing unit and the image display module, wherein the encoding module is used for transmitting the second image data to the image display module through the data managing unit and the communication interface;

wherein the data managing unit includes a memory address corresponding to both the first memory and the second memory, a memory space of the second memory is greater than a memory space of the first memory;

wherein the data managing unit includes a data compression module for compressing the second image data and storing the compressed second image data selectively in the first memory or the second memory; and wherein if the size of the second image data is larger enough, the data managing unit will store the second image data in the second memory instead of the first memory.

* * * * *